April 28, 1953    E. G. BAILEY ET AL    2,636,483
STEAM GENERATOR
Filed April 8, 1949    11 Sheets-Sheet 1

INVENTORS
Ervin G. Bailey &
BY Ralph M. Hardgrove
ATTORNEY

INVENTORS
Ervin G. Bailey &
BY Ralph M. Hardgrove
ATTORNEY

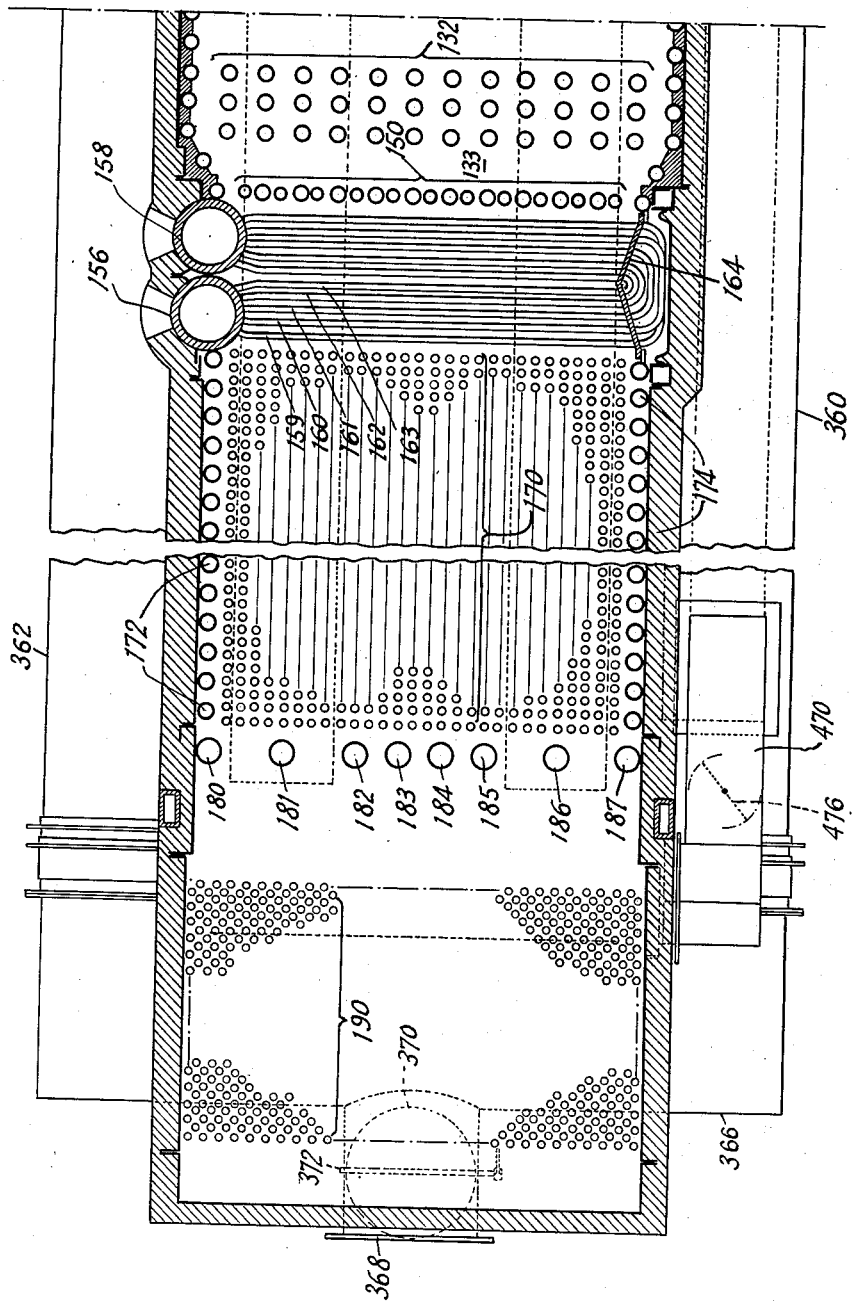

April 28, 1953     E. G. BAILEY ET AL     2,636,483
STEAM GENERATOR
Filed April 8, 1949     11 Sheets-Sheet 6
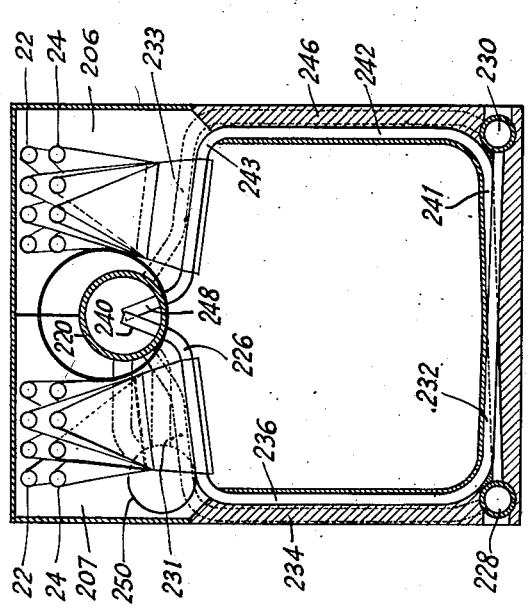
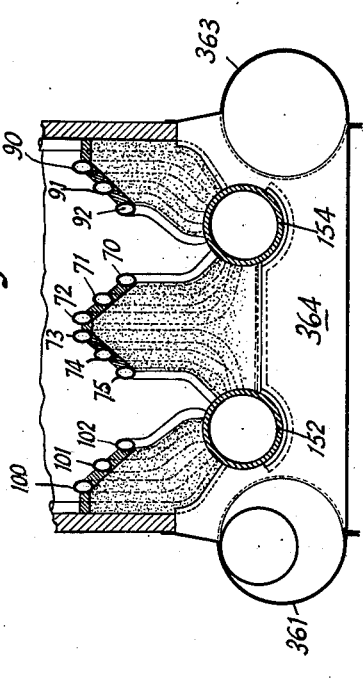
INVENTORS
*Ervin G. Bailey &*
BY *Ralph M. Hardgrove*
*M. Holbrook* ATTORNEY April 28, 1953 E. G. BAILEY ET AL 2,636,483
STEAM GENERATOR
Filed April 8, 1949 11 Sheets-Sheet 7

INVENTORS
Ervin G. Bailey &
BY Ralph M. Hardgrove

ATTORNEY

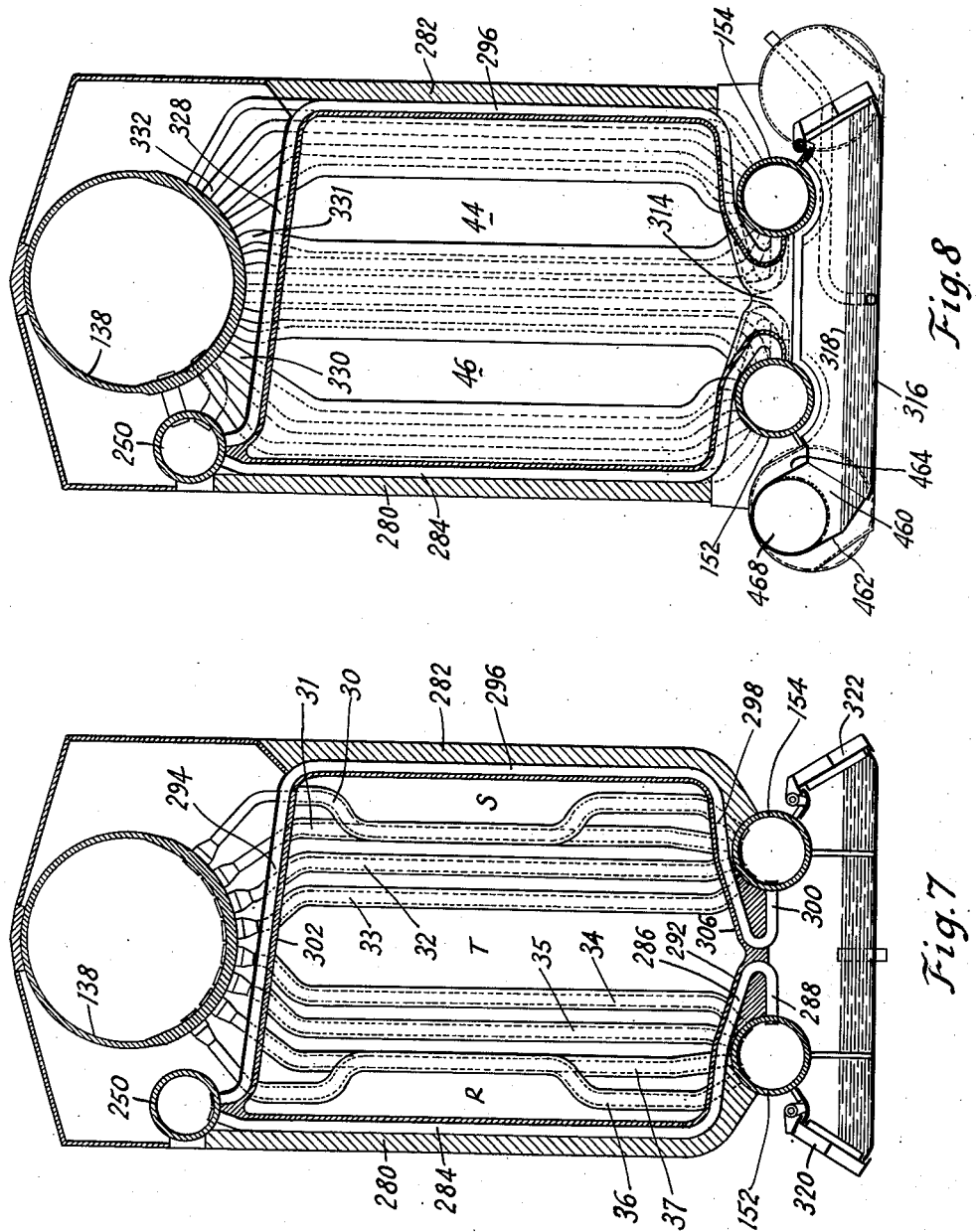

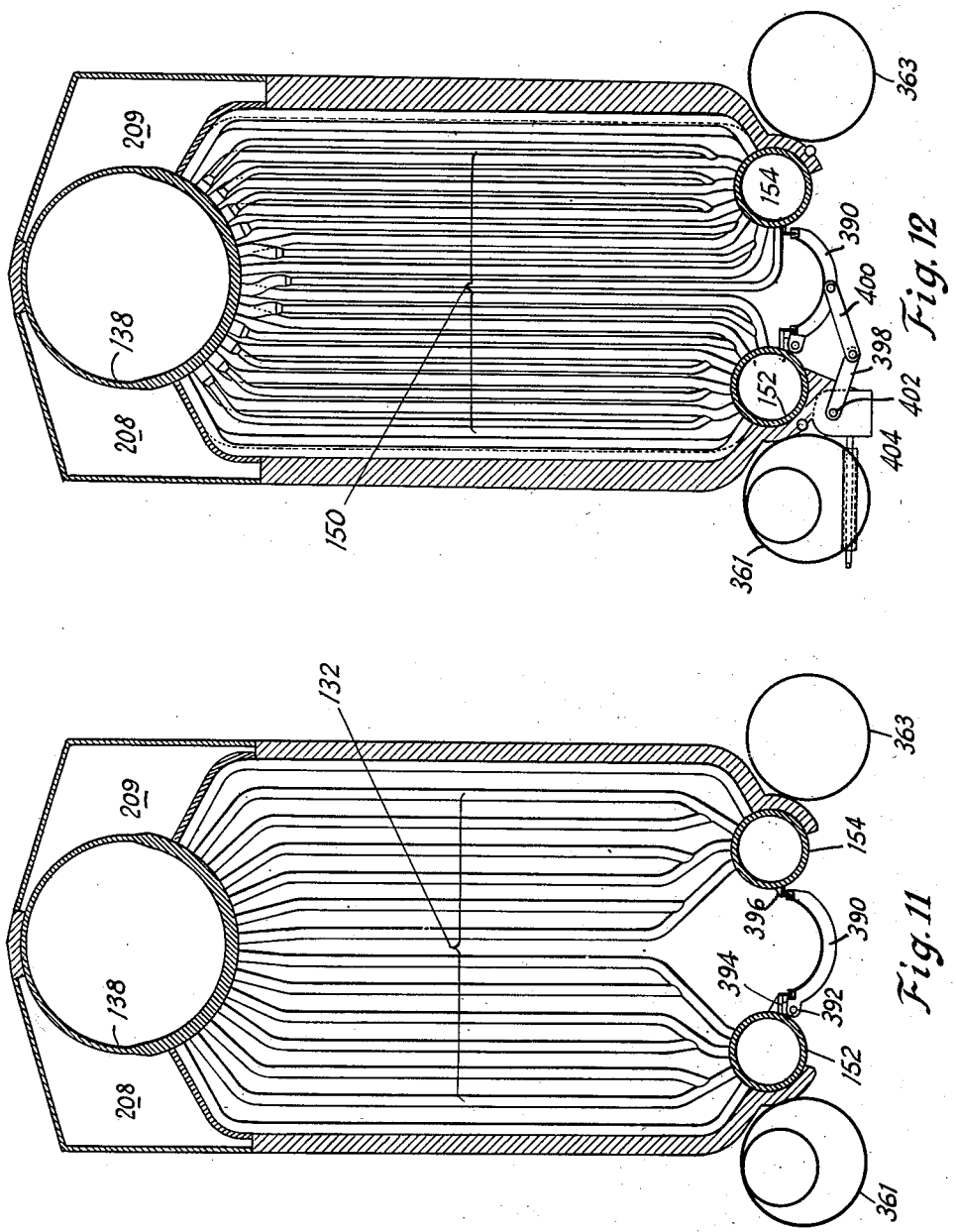

INVENTORS
*Ervin G. Bailey &*
BY *Ralph M. Hardgrove*
*R M Holbrook* ATTORNEY

April 28, 1953 E. G. BAILEY ET AL 2,636,483
STEAM GENERATOR
Filed April 8, 1949 11 Sheets-Sheet 11

INVENTORS
Ervin G. Bailey &
BY Ralph M. Hardgrove

*W.M.Holbrook* ATTORNEY

Patented Apr. 28, 1953

2,636,483

UNITED STATES PATENT OFFICE 2,636,483

STEAM GENERATOR

Ervin G. Bailey, Easton, Pa., and Ralph M. Hardgrove, Canton, Ohio, assignors to The Babcock & Wilcox Company, Jersey City, N. J., a corporation of New Jersey Application April 8, 1949, Serial No. 86,171

23 Claims. (Cl. 122—328)

Our invention relates to steam generators burning a slag forming fuel at high rates of heat release and utilizing the products of combustion therefrom in the generation of superheated steam.

More particularly our invention involves the combustion of the fuel under furnace temperature conditions conducive to the release and maintenance of the ash in molten form, and subsequent conditioning of the high temperature products of combustion delivered by the furnace to quickly alter the physical condition of the gas borne slag particles from molten to semi-solid condition by cooling through the admixture of streams of low temperature tempering fluid to thereby inhibit slag accumulation on subsequent convection steam generating and superheating surfaces.

Further, our invention provides apparatus and a method of operation thereof which is adaptable to the burning of pulverized coal at adequately high rates and in the restricted available furnace spaces of mobile boiler units, such as a steam locomotive, delivering products of combustion carrying suspended residual ash particles in a physical form conductive to sustain high capacity heat absorption of the convection surfaces of the boiler.

Our invention involves such treatment of the molten slag carrying products of combustion that a high degree of separation of the slag in molten form is attained in the zone of the primary furnace. It also involves such a degree of cooling of the combustion gases leaving the primary furnace that the residue of particles of suspended incombustibles will be cooled in the tempering zone to such a degree that they will not objectionably adhere to the subsequent heat absorbing surfaces. In this tempering zone slag particles are solidified so that they separate from the gases. Subsequently, remaining solids suspended in the gases are separated in the convection section in fly ash accumulation zones.

To accomplish such cooling of the slag particles carried in suspension by the gases leaving the primary furnace, our invention involves fluid cooled convection heating surfaces in the path of the gases at that position. The tubes forming these surfaces are arranged to form a plurality of tempering passages in front of which there are shadow tubes. The tubes on either side of these passages are arranged so as to form inclined ducts for a furnace gas tempering fluid which is discharged transversely of, and mixed with, the furnace gases flowing through said passages, the fluid being discharged through openings formed between some of said tubes. Just rearwardly of these passages there are water cooled tube platens causing further mixing of the tempering fluid and the furnace gases before the latter contact the relatively closely spaced tubes of the convection screen bank ahead of the superheater.

By the use of the above indicated combination of features along with attendant slag and ash receiving chambers, two functional zones, one for slag removal, and another for slag tempering, are provided in the restricted space for a locomotive boiler, intermediate the combustion space and the convection surface. This combination is particularly effective in a steam generating installation involving horizontal flow of high temperature combustion products from a pulverized coal firing furnace.

Our invention also involves a downwardly fired pulverized coal burning furnace which is vertically restricted and substantially limited as to combustion space. In this furnace the flames from the burners impinge upon the floor or bottom of the combustion chamber. Under these conditions, and under certain rates of firing, fuel particles are caused to be impinged upon a stratum of molten slag upon the combustion chamber floor. This action promotes effective combustion, and, in some instances, it is supplemented by action in additional combustion space provided in a horizontal extension of the furnace which has a greater vertical dimension. This arrangement provides for effective zones of molten slag removal, and involves the flow of slag from the stratum directly opposite said burners to a lower slag outlet.

The various features comprising our invention are pointed out with particularity in the claims which form a part of this specification, and for a better understanding of the invention, its operating advantages and the specific objects attained by its use, reference should be had to the accompanying drawings in which we have illustrated a preferred embodiment of the invention.

Figure 1:
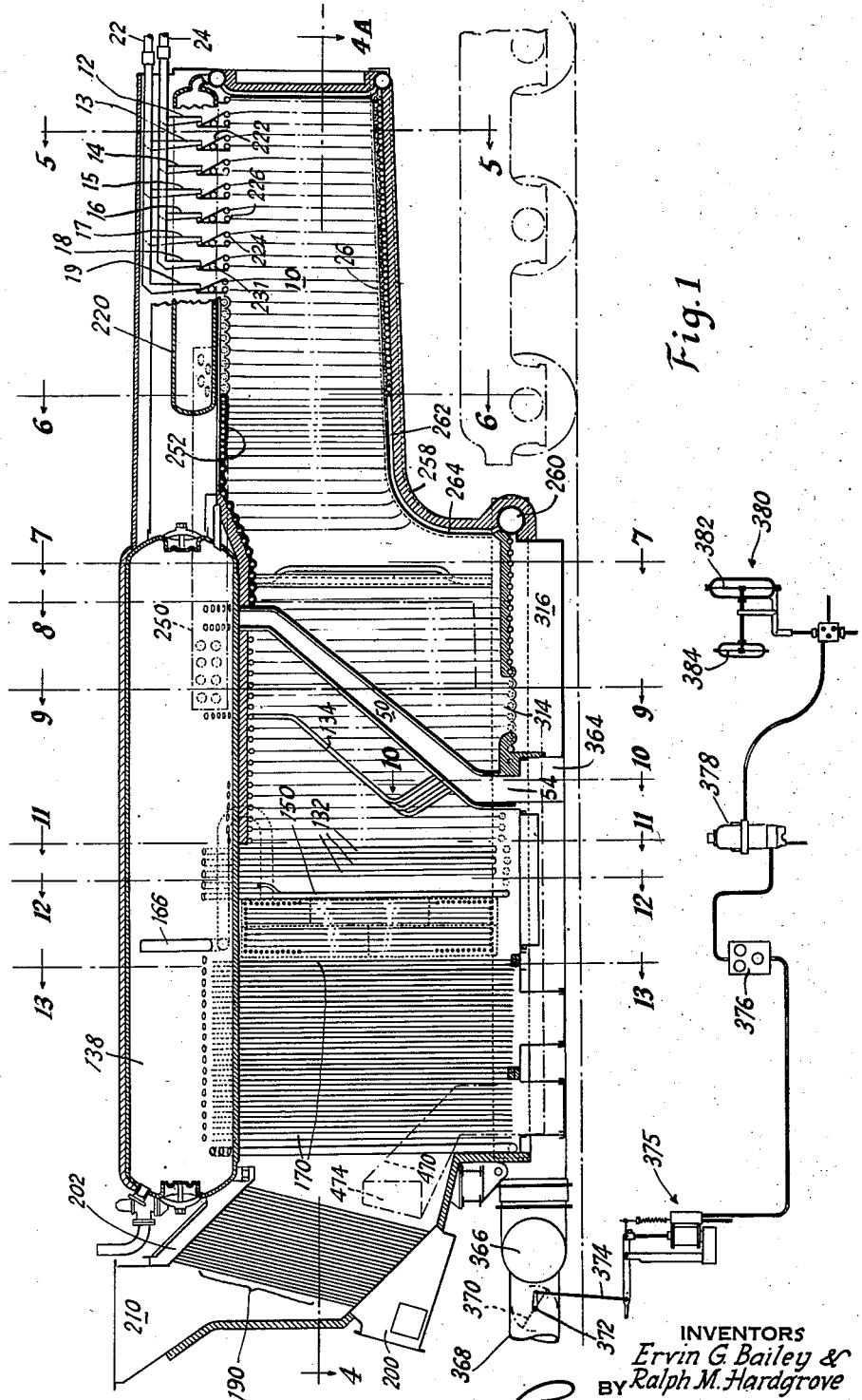
Fig. 1 is a longitudinal vertical section of the steam generator particularly showing the inclined passages for a tempering fluid at the outlet of the primary furnace.
Figure 4A:
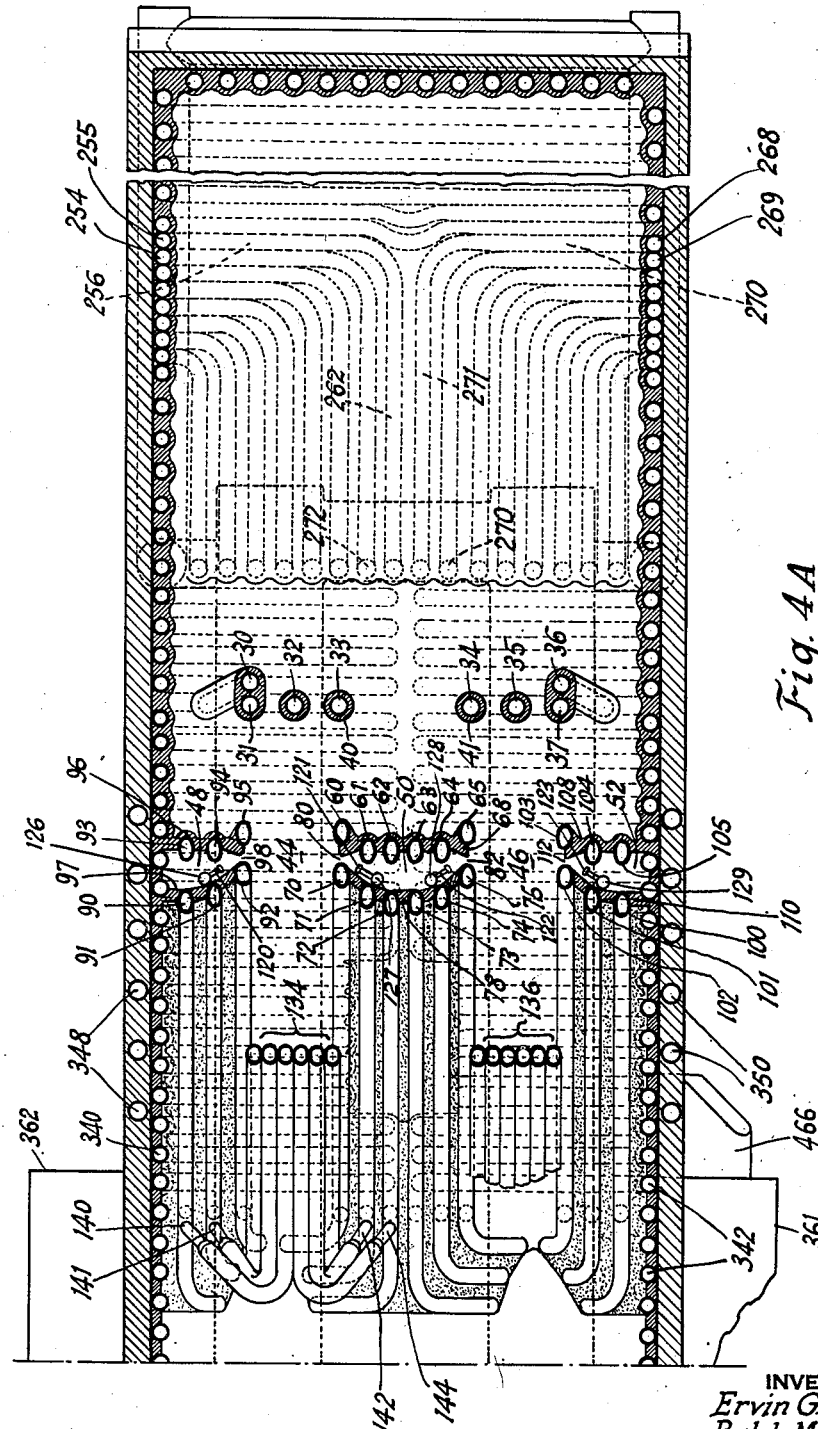
Figure 13:
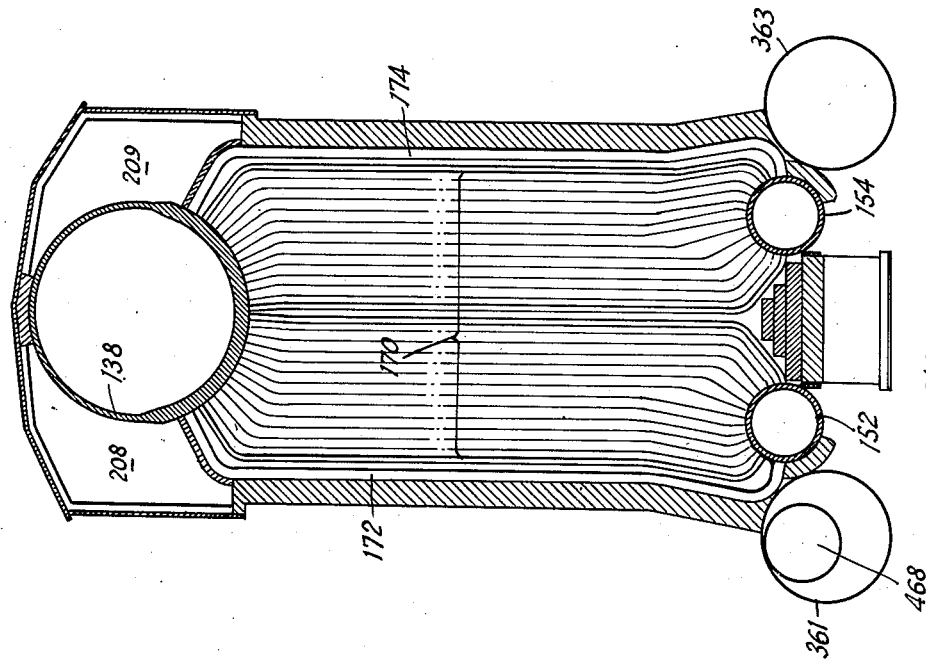
Figure 6:
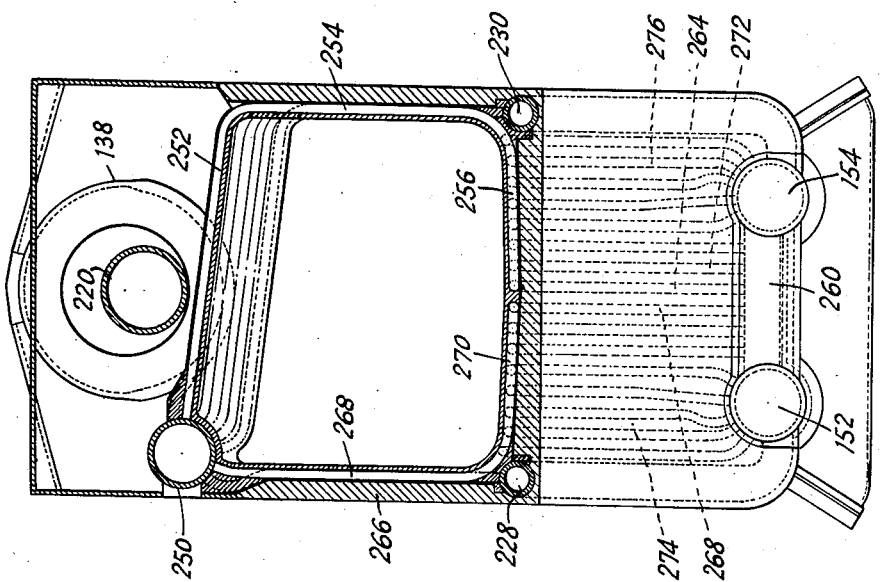
Figure 14:
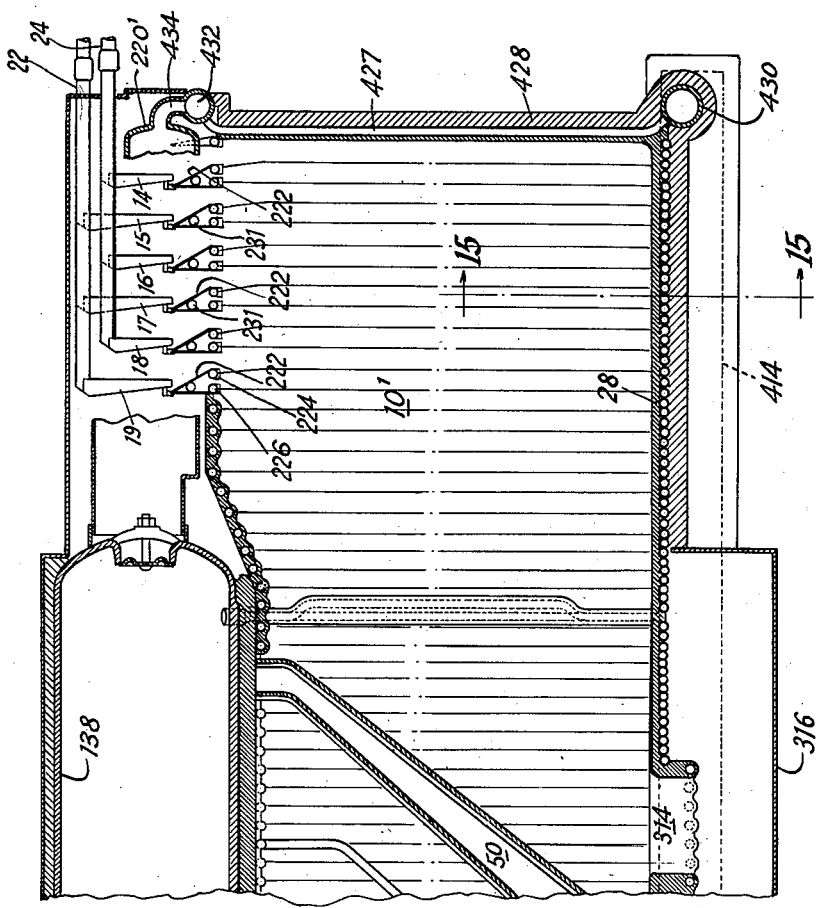
Figure 15:
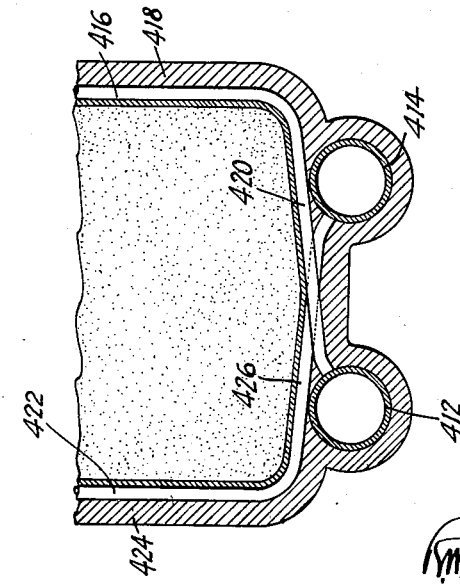
Figure 17:
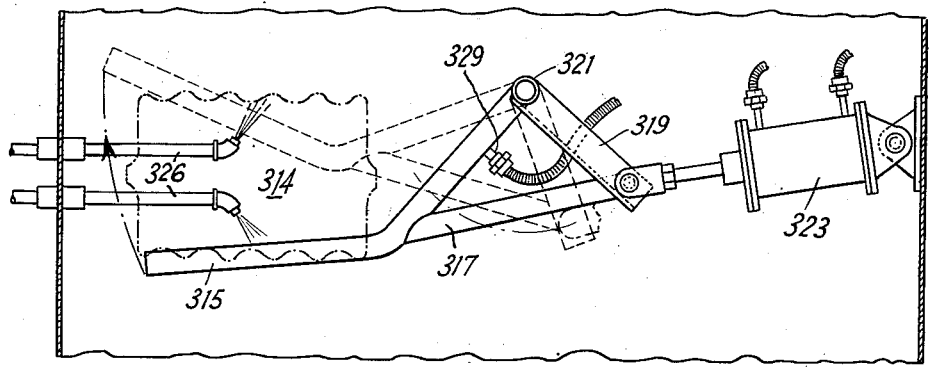
Figure 16:
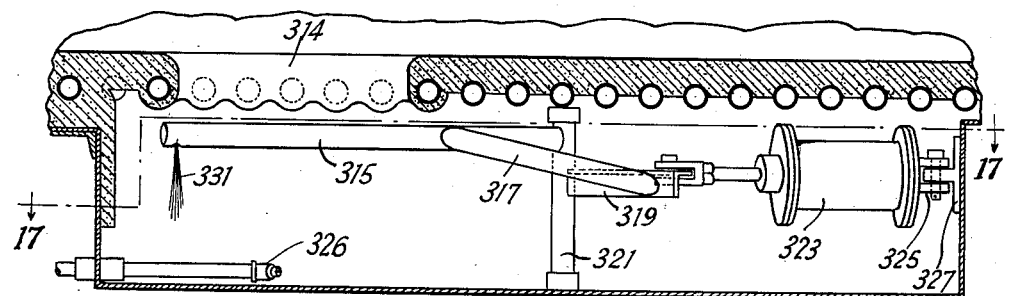

Figs. 4 and 4A constitute a horizontal or plan section of the Fig. 1 installation on the line 4—4a of Fig. 1, and on an enlarged scale;

Fig. 5 is a vertical transverse section through the primary furnace, on the line 5—5 of Fig. 1;

Fig. 6 is a vertical transverse section through the primary furnace at a position rearwardly of the fuel burners and indicated by the line 6—6 of Fig. 1;

Fig. 7 is an intermediate transverse vertical section through the primary furnace at a position indicated by the line 7—7 of Fig. 1. This view shows the shadow tubes in elevation;

Fig. 8 is a transverse vertical section showing the furnace gas passages through the slag and furnace gas tempering zone, taken on the section line 8—8 of Fig. 1;

Fig. 9 is a transverse vertical section on the line 9—9 of Fig. 1 particularly showing the tempering fluid ducts formed by the forwardly inclined heat absorbing tubes at the gas outlet of the primary furnace;

Fig. 10 is a partial vertical section on the line 10—10 of Fig. 1 showing the concave face arrangement of the sets of tubes for the tempering fluid ducts;

Fig. 11 is a transverse vertical section on the line 11—11 of Fig. 1 showing the widely spaced screen tubes in front of the superheater;

Fig. 12 is a transverse vertical section on the line 12—12 of Fig. 1 showing the arrangement of the closely spaced screen tubes immediately in front of the superheater;

Fig. 13 is a transverse vertical section on the line 13—13 of Fig. 1 showing the arrangement of the tubes in the main steam generating section of the installation;

Fig. 14 is a partial longitudinal vertical section of the primary furnace section of a modified form of the invention;

Fig. 15 is a partial transverse vertical section taken on the line 15—15 of Fig. 14 showing the arrangement of floor and wall tubes for the primary furnace;

Fig. 16 is a vertical section through the slag pan, showing in elevation, slag clearer and steam jets for slag displacement; and Fig. 17 is a plan section on the line 17—17 of Fig. 16.

The steam generating installation shown in the drawings and more particularly indicated in Fig. 1 includes a primary furnace 10. This furnace is vertically restricted as shown and its boundary surfaces are defined by wall cooling tubes appropriately connected into the circulatory system of the installation. Here, the primary furnace is fired by pulverized fuel burners 12-19, inclusive, supplied with a mixture of pulverized fuel and primary air through tubes such as those shown at 22 and 24.

In the operation of the illustrative installation, the flames from the pulverized fuel burners impinge against a stratum of molten slag upon the rearwardly inclined floor 26 it being understood that a modified arrangement wherein the burners would be directed horizontally against an opposite wall, would be within the scope of the invention. The combustion products then pass through the rearward extension of the primary furnace and across and between the upright shadow tubes 30—37 (Figs. 4a and 7). These tubes are connected into the fluid circulation of the installation and are exteriorly covered with a non-metallic refractory as indicated at 40 and 41 in Fig. 4a.

After passing the shadow tubes, the gases are caused to flow through tempering passages 44 and 46 between forwardly inclined groups of steam generating tubes arranged to form the ducts 48, 50 and 52 for a tempering fluid such as steam or air. The inlets, such as 54 (Fig. 1), of these ducts are appropriately connected with a source of tempering fluid such as exhaust steam, at the bottom of the installation.

The middle duct 50 for tempering fluid has its forward wall formed by the forwardly inclined steam generating tubes 60—65, the spaces between these tubes being closed by non-metallic refractory 68 installed in a semi-plastic condition around metallic studs welded to the tubes. This construction is known as a stud tube wall. These tubes are also arranged so that the wall presents a concave face toward the oncoming furnace gases. The tubes 70—75 defining the rear wall of the tempering fluid duct 50 are similarly arranged to present a concave face forwardly. This wall is also a stud tube wall, including the refractory materials 78. This rearward wall is so spaced from the front wall of the duct 50 that on one side a narrow upright slot 80 is formed for the transverse discharge of the tempering fluid across the furnace gases and other products of combustion flowing through the passage 44. At the other side of the duct 50 a similar slot 82 is formed for the flow of tempering fluid transversely of the combustion products in the passage 46.

The tempering fluid duct 48 at the outer side of the passage 44 opposite the slot 80 is similarly formed by stud tubes 90—95 and refractory material 96 and 97 to present an upwardly extended slot 98 for tempering fluid flow into the stream of combustion products passing rearwardly through the passage 44. In a like manner, the duct 52 is formed by similarly arranged stud tubes 100—105 with the spaces between them closed by refractory material 108. A discharge slot 112 for tempering fluid flow into the passage 46 is formed between the tubes 102 and 103. The tubes 95 and 103 of the side wall ducts project forwardly of the forward faces of their respective ducts to provide forwardly facing rims, similar to the rims formed at the margins of the forward face of the central duct 50 by the tubes 60 and 65.

The duct 48, 50, and 52 are provided with steam jet nozzles, such as 120—123, several of which are secured at vertically spaced positions to the forwardly inclined tubes 126—129 connected to a source of steam under pressure. The steam jets periodically issuing from these nozzles are directed through the slots 80, 82, 98, and 112 to clear the slots of slag accumulations which might otherwise restrict the effective discharge of tempering fluid.

Figure 3:
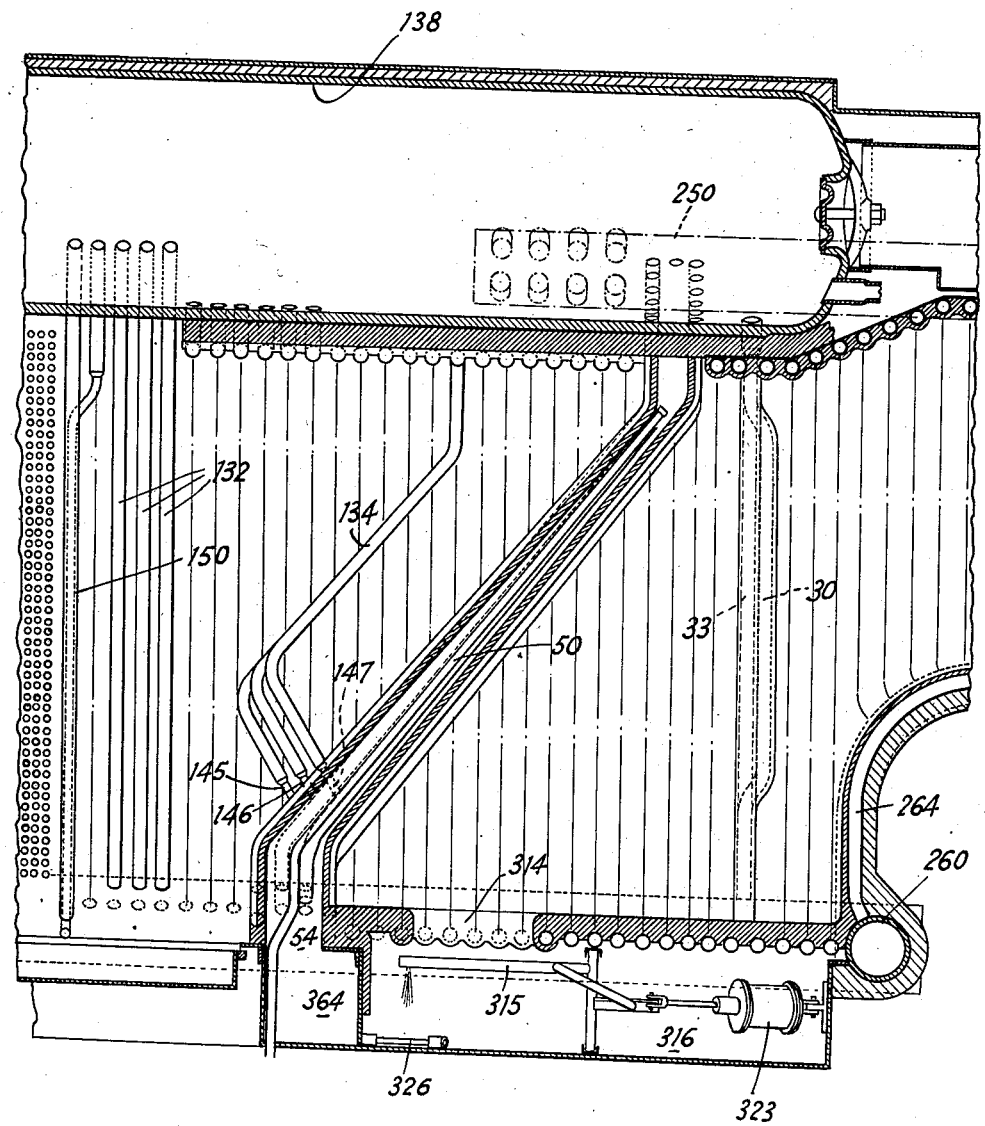
Fig. 3 is a partial longitudinal vertical section showing that part of the steam generator immediately to the rear of the part shown in Fig. 2 and illustrating particularly the forwardly inclined ducts for the furnace gas tempering fluid.

Interposed between the tempering passages 44 and 46 and the bank of widely spaced screen tubes 132 (Figs. 1, 3, and 11) are the tube platens 134 and 136. The tubes forming these platens are forwardly inclined as are the tubes forming the fluid tempering ducts and each platen is shown as consisting of six tubes which are appropriately connected into the fluid circulation of the installation and are arranged in substantially contiguous relation to form radiant heat shields and gas flow deflectors between the primary furnace 10 and the bank of screen tubes 132. As shown, these tubes are connected at their upper ends to the steam and water drum 138, and at their lower ends to the lower parts of the tubes forming the ducts 48, 50, and 52 for the tempering fluid. Such latter connections are indicated at 140—144 in Fig. 4a and at 145—147 in Fig. 3. The platens are disposed directly rearwardly of the tempering passages 44 and 46. They also divide the chamber between the tube bank 132 and the passages 44 and 46 into two zones, the rearward zone being free of transverse tubes or other obstructions so as to promote the separation of ash, and its collection in the subjacent ash chamber (Fig. 10).

After passing between the widely spaced tubes of the screen 132 the furnace gases pass through the flow equalizing space 133 and then between, and around, the closely spaced tubes of the superheater screen 150 (see Fig. 4). The upright tubes of this screen are connected at their upper ends to the steam and water drum 138, and at their lower ends to the headers 152 and 154 (see Fig. 12). The screen formed by these tubes is disposed immediately in front of the superheater which includes two upright headers 156 and 158. These headers are connected by the U-tubes 159—162 (Fig. 4) at closely spaced vertical positions along the headers to form a bank of closely spaced small diameter tubes conducting steam from one header to the other in a plurality of vertically successive passes. A plurality of diaphragms in the headers provide for such flow. At the side of the installation, opposite the headers 156 and 158, the superheater tubes are held in their spaced relationship by an upright support 164, the entire superheater unit being so arranged with reference to the related parts of the installation that the superheater may be disconnected from its associated parts and bodily removed from the installation for the purposes of maintenance or repair.

The inlet header 156 of the superheater is connected to the steam space of the steam and water drum by a tubular connection part of which is shown at 166 and the superheater outlet 158 is connected to a steam turbine or other prime mover. Rearwardly of the superheater, there is disposed a bank 170 of closely spaced steam generating tubes, the arrangement of these tubes being particularly indicated in Figs. 4 and 13. In the latter, these tubes are shown as having their lower ends connected to the headers 152 and 154 and their upper ends connected to the steam and water drum 138.

As indicated in Fig. 4, there are rows of large diameter downcomer tubes 172 and 174 along the sides of the gas pass and alongside the bank 170 of steam generating tubes. Other large diameter downcomers 180—187 are disposed in a row extending transversely of the installation at a position beyond the bank of steam generating tubes 170 (see Fig. 4). These tubes directly connect the steam and water drum 138 and the lower headers 152 and 154.

After passing between the tubes of the steam generating bank 170 and the downcomer tubes 180—187, the furnace gases pass across the bank of air heater tubes 190. These tubes are shown as forwardly inclined and as connecting an air inlet 200 to an air outlet chamber 202. From the latter the heated air passes to and through horizontal ducts 208 and 209 at either side of the steam and water drum 138 to the secondary air chambers 206 and 207 (Fig. 5) enclosing the fuel burners 12—19. After passing across the tubes of the air heater 199, the furnace gases pass through a flue 210, connected to a suitable stack (not shown), discharging to the atmosphere. A suitable blower (not shown) is connected to inlet 299, the pressure developed thereby being sufficient to overcome all air and furnace gas flow resistances.

Figure 2:
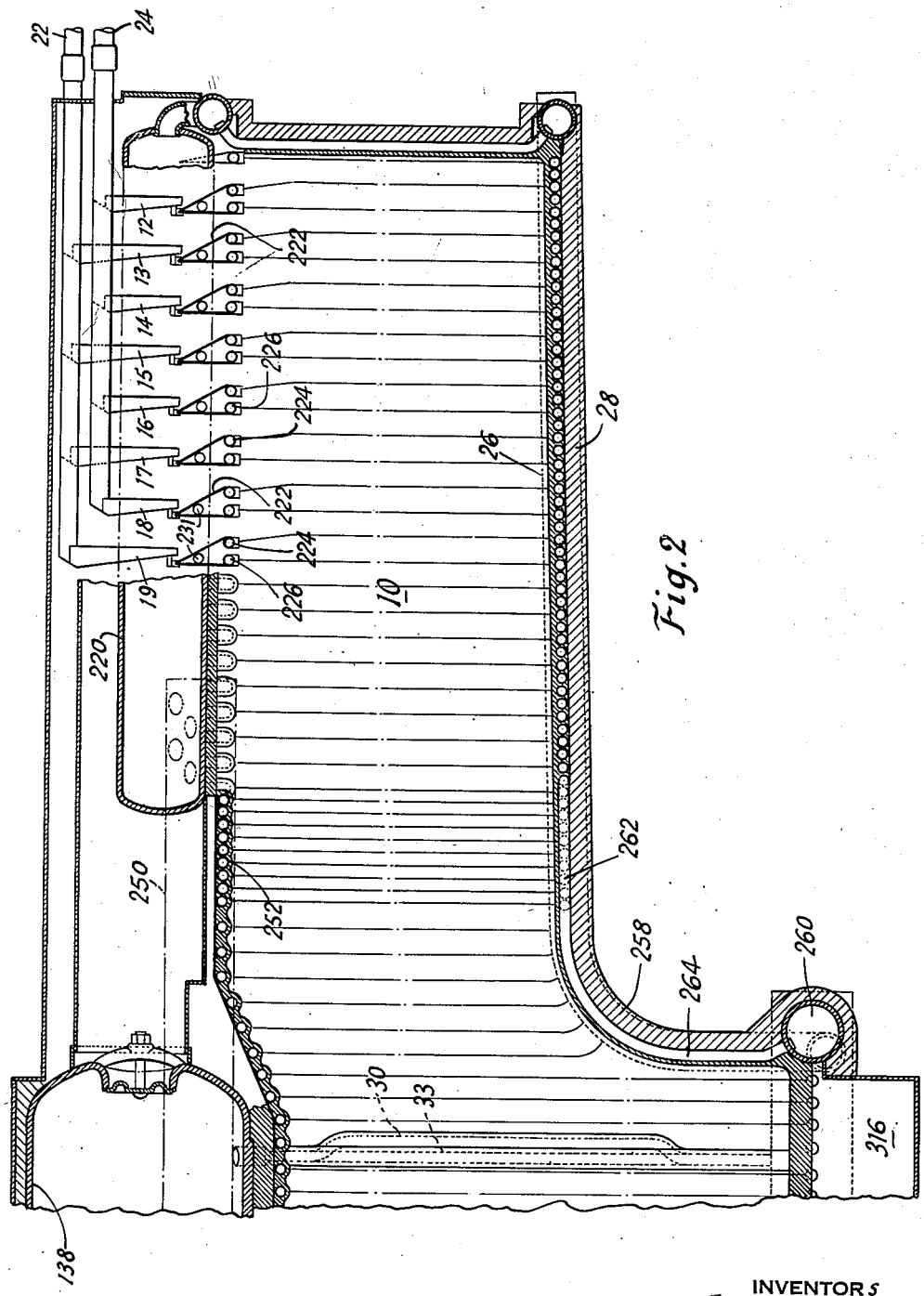
Fig. 2 is a partial longitudinal vertical section on an enlarged scale, showing a major part of the primary furnace.

As shown in Fig. 5 of the drawings, there are eight of the upper pulverized fuel tubes 22 connected to a corresponding number of tapered burner nozzles. There is a similar number of the lower pulverized fuel tubes 24 similarly connected to like nozzles. One-half of the total number of burner nozzles are arranged in a group in the secondary air chamber 206 on one side of the upper header 220 and the remaining burners are arranged in a group in the other secondary air chamber 207 on the other side of the header. Each of these nozzles widens in its dimension transversely of the furnace as it tapers downwardly and directs a stream of pulverized fuel and air against its separate deflector 222. Each deflector is arranged to further mix its stream with secondary air and spread the fuel air stream and direct it between successive tube groups such as 224 and 226 into the primary furnace 10 (Fig. 2). The fuel and air stream which is directed downwardly between the groups of tubes enters with such velocity that, after ignition, the flame is carried to the lower part of the furnace where it impinges against the slag stratum 26 upon the floor of the primary furnace.

Fig. 5 further indicates the construction of the forward part of the primary furnace, including the lower headers 228 and 230. From the header 230 spaced floor tube sections 232 extend toward the opposite wall 234 of the furnace and thence upwardly in sections 236 to roof sections such as 226 which have their outlet ends 240 connected to the upper header 220. Similarly, a plurality of tubes with corresponding floor, wall, and roof sections 241—243 extend from the header 228 toward the wall 246, and then upwardly along this wall to the roof where they are similarly connected to the header 220, as indicated at 248. With the floor tube sections alternately positioned in closely spaced relation the furnace floor beneath the burners is provided with an effective heat absorbing arrangement, necessary on account of the flame impingement.

The construction of the primary furnace, as indicated in Fig. 5, also involves opposite recirculator tubes leading from the header 220 downwardly along the walls 246 and 234 to the lower headers 228 and 230. The roof sections of these recirculator tubes, such as 231 and 233, are disposed above pairs of the roof tube sections such as 226 and 243 of the other wall tubes so that they are arranged within the fuel deflectors 222, in a manner indicated particularly in Figs. 1 and 2. The deflectors are also supported by these tubular sections.

Fig. 6 indicates the construction of the primary furnace at a position rearwardly of the burners. Ths construction involuves an upper header 250 to which are connected successive tubes having roof sections 252 leading to the opposite side of the installation. Thence their wall tube sections 254 extend along the wall 254 to the floor tube sections 256. The successive floor tube sections are of different length and shapes. Some of them extend rearwardly along the rear curved portion of the primary furnace wall 258 and downwardly at positions to connect with a header 260 at longitudinally spaced positions. This header, as indicated in Fig. 6 is a short transverse tubular section directly connected to the lower laterally positioned headers 152 and 154 to which a number of the tubes from the upper header 250 are connected. For example, the tube having the sections 252, 254, and 256 has a rearwardly extending floor section 262 (Fig. 4A) continuing in downwardly extending section 264 which is directly connected to the header 260 as indicated in Fig. 1. Similarly, and along the opposite wall 266 is a tube having a wall section 268 and a transversely extending floor section 270. This tube continues rearwardly along the floor of the furnace with a section 271 (Fig. 4A) similar to the section 262 and then downwardly to the header 260 with a section 269 similar to the section 264.

The tubes shown in full lines in Fig. 6 have wall sections 254 and 268 disposed in vertical positions adjacent the section line 6—6 of Fig. 1 and the next adjoining tubes rearwardly of the installation are similarly formed and arranged, having the wall tube sections 255 and 269 (Fig. 4A) and downwardly extending sections 270 and 272 directly connected to the header 260 as indicated in Fig. 6. There are other pairs of wall tubes which are similarly formed and arranged with direct connections to the header 260, and the remaining wall tubes leading from the header 250 in the manner indicated in Fig. 6 have their lower portions, such as 274 and 276, connected respectively to the longitudinal headers 152 and 154.

Fig. 7 illustrates the furnace construction at a position looking toward the shadow tubes 30—31. Tubes 30 and 36 are offset to form the relatively wide gas passages R and S directly in front of the forward walls of the tempering fluid ducts 48 and 52, and all of the tubes are disposed in two widely spaced groups to form the wide central gas passage T forwardly of the concave wall of the duct 50.

Also, in the Fig. 7 section of the installation, the furnace wall sections, such as 280 and 282, are of a vertical extent greater than that of wall sections adjacent the burners and are defined by wall tube sections having their upper ends directly connected to the header 250. Along wall 280 are disposed the spaced wall tube sections 284 having at their lower ends inwardly bent floor sections 286 extending to a position adjacent the center line of the installation and then reversely bent to present lower end sections 288 which are directly connected to the header 152. The furnace sides of these tubes are covered with refractory material such as that indicated at 290 and 292.

The roof of the primary furnace at the section indicated in Fig. 7 is defined by downwardly inclined roof tube sections 294, these sections being integral with the wall tube sections 296 and the floor tube sections 298. The latter extend inwardly to positions adjacent the opposite tubes and then have their reversely bent lower end sections 300 directly connected to the header 154. The furnace sides of these tubular sections are covered with high temperature refractory material which fills the spaces between the tubes to form the roof 302, the wall 304 and the floor section 306, the floor of the furnace being transversely continuous at this position.

Figs. 8 and 9 indicate the construction of the installation at a position rearwardly of the shadow tubes and looking toward the furnace gas passages 44 and 46. At the position indicated in Fig. 9, the floor tube sections such as 310 and 312 are shorter than the similar sections indicated at 286 and 298 in Fig. 7 so as to provide for an opening 314 though which molten slag passes from the floor of the primary furnace into a slag pan 316. This slag pan is preferably of rectangular construction extending across the width of the installation and secured to the headers 152 and 154. It normally has a water level 318 (Fig. 8). With this arrangement, molten slag passing through the opening 314 is quenched as it drops into the water and the quenched slag is periodically removed through side openings which are normally closed by the water tight doors 320 and 322.

As indicated in Fig. 1 of the drawings, the slag discharge opening 314 is disposed above the rearward portion of the slag pan 316. In order to prevent excessive accumulation of the slag in this position, steam jets 326 are provided for periodic operation to move the accumulated slag toward the opposite end of the slag pan. The action of these jets also promotes the granulation of the slag.

The slag discharge opening 314 is disposed at a position adjacent the lower ends of the tubes forming the front wall of the tempering gas duct 50 and is thus coordinated with the forward inclination of these tubes to promote the separation of high percentage of molten slag in the primary furnace.

For the purpose of periodically clearing the slag opening 314 from slag accumulations which would otherwise close this opening, the swinging arm construction of Figs. 16 and 17 is provided. This includes the tubular arm 315 rigidly associated with the braces 317 and 319, and the post 321. The latter is pivotally supported for oscillation of the arm 315 across the slag discharge opening 314 by the actuating cylinder 323. This, in turn, is pivotally supported by the elements 325 and 327 the latter of which is secured to the slag pan. The arm 315 is cooled by water supplied at 329 and discharging, as at 331, through one or more openings in the arm. This supply of water to the slag pan replaces water lost by evaporation, and the flow through arm 315 may be regulated to maintain the water level.

Slag drainage through the opening 314 is facilitated by the provision for the flow of furnace gases downwardly through the opening and then through a by-pass leading to a position beyond the bank of steam generating tubes 170. The inlet of this by-pass is indicated at 460 (Fig. 8). It is also shown in Fig. 8 and Fig. 4A as formed by the ductwork walls 462, 464, and 466, beyond the front end of the tempering fluid duct 361. The inlet is thus connected with the longitudinal by-pass duct 468 (Figs. 8 and 13) disposed within the larger diameter duct 361 and extending rearwardly therein to a position near the rearward side of the bank of steam generating tubes 170 where it is connected with a side duct 470 (Fig. 4), extending upwardly through the wall of the duct 361 at that position and then through the wall 472 (Fig. 4) to an outlet 474 (Figs. 1 and 4) communicating with the gas space just forwardly of the air heater 190. Gas flow through the by-pass is controlled by a damper 476 (Fig. 4).

The arrangement of the upper end of the tubes forming tempering ducts 48, 50, and 52 with reference to the roof tube sections such as 328 is indicated in Fig. 8 of the drawings. The upper portions of the tempering fluid duct tubes extend between successive roof tube sections such as 328 to direct connections with the steam and water drum 138. Such connections are indicated, for example, at 330—332.

The section of the installation indicated by Fig. 9 has its wall defined by wall tube sections such as 340 and 342 which are integral with furnace roof sections such as 344 and 346 connected directly to the water space of the steam and water drum 138. These tubes continue downwardly to positions near the bottom of the furnace where they have their inwardly bent floor sections 310 and 312 disposed in opposite relationship adjacent their connections with the headers 152 and 154. Forwardly of the tubes forming the tempering fluid ducts 48, 50 and 52, and in the zone of the primary furnace, the parts of the wall tube sections such as 340 and 342 have their furnace sides covered with high temperature refractory material as indicated at 341 and 343, but rearwardly of the duct tubes (such as 100—105 inclusive) the wall tube sections, such as 340 and 342, present bare metal to the furnace gases to contribute to the cooling of the gases. As a result, the lower parts of some of these wall tube sections have their furnace sides refractory covered while the furnace sides of the upper parts of the same tubes are bare. Exteriorly of the wall tube sections 340 and 342 are the upright sections such as 348 and 350 of recirculator tubes. The roof sections, 352 and 354 of the same tubes extend inwardly to points of direct connection with the drum 138, as clearly indicated. The lower ends of the recirculator tubes are connected with the headers 152 and 154 as indicated at 356 and 358. Fig. 9 also indicates the circulatory connections 360 and 362 between the rearward end of the upper laterally positioned header 250 and the water space of the steam and water drum 138.

Fig. 10 shows the large diameter laterally positioned ducts 361 and 363 by which steam, as a tempering medium, is conducted to a transversely extending chamber 364 communicating with the lower ends of the tempering fluid ducts 48, 50 and 52. The laterally positioned ducts 361 and 363 extend rearwardly of the installation to a position wherein they are in communication with the transverse duct 366 (Fig. 1). Steam, at a suitable pressure, as from the exhaust of a steam turbine, flows to the transverse duct 366 through an inlet connection 368 which is provided with a valve or damper 370. This valve is automatically controlled by reason of the connection of its valve stem 372 with an operating link 374 of a control system including the damper operator 375, the selector valve 376 for causing the control to selectively operate either manually, or automatically through the Standatrol 378, and the double diaphragm ratio controller 380, the latter causing the control system to respond to variations in the flow of combustion air to the fuel burning system.

This double diaphragm ratio controller has a large diaphragm 382 and a small diaphragm 384, the latter being responsive to the flow of tempering fluid and the former to the flow of combustion air as a measure of steam load. The diaphragm 384 functions to measure the pressure differential of a flow measuring device such as an orifice or a Pitot tube in the tempering steam line, and the diaphragm 382 is subject to flow indicating pressures of a corresponding flow indicating device arranged in the combustion air supply line. A similar automatic control mechanism automatically varies the firing rate of the furnace in response to load demands, and when the rate of firing or the load reaches a predetermined value, the ratio controller 380 will effect automatic control of flow of tempering fluid in proportion to the rate of heat liberation as determined by secondary air flow. Thus, with higher heat release rates, more tempering fluid will be introduced in order to increase the cooling action.

Figs. 11 and 12 of the drawings, besides showing the arrangement of tubes in the tubular screens forwardly of the superheater also show the ash pan 390. This is arranged as a trough pivoted along one side as indicated at 392 to a support 394 secured to header 152 and, in closed position, has a sealing arrangement with the structural member 396 secured to the header 154. The ash pan is periodically opened to allow the collected solids to drop from the installation by the operation of a mechanism including the links 398 and 400, the former of which has one end fixed to a shaft or trunnion 402 of a transmission mechanism 404 the operating shaft 406 of which extends through the steam duct 360 to an outside position so that an operating handle may be secured thereto. After the ash pan has been opened so as to allow dumping of the collected solids, it is returned to its closed position in which it is shown in Figs. 11 and 12.

Fig. 13, besides showing the arrangement of the tubes of the main steam generating bank 170, also discloses outside rows of tubes 172 and 174 leading from the steam and water drum 138 along the vertical walls to the headers 154 and 152, respectively. These tubes may act to afford downcomer capacity in addition to that afforded by the tubes 180—187.

The modification shown in Figs. 14 and 15 of the drawings differs from that shown in Fig. 1 and other figures by presenting a combustion chamber 10′ with its floor 28 horizontally extended at the same level from the forward end of the furnace to the slag opening 314′. With this construction, the headers 412 and 414 (Fig. 15) are extended to the extreme front end of the generator and are connected by intersecting tubes to an upper steam and water drum corresponding to the drum 220′. The manner in which these tubes extend upwardly from the headers 412 and 414 is shown in Fig. 15. Here, the tube having a wall section 416 along the upright wall 418 continues into a downwardly inclined furnace floor section 420 extending more than half across the furnace for connection with the header 412. On the other side of the furnace, similar tubes having upright wall tube sections such as 422 along the wall 424 continue in horizontally inclined floor sections such as 426 across the other half of the floor of the furnace for connection with the header 414. The wall tubes 427 along the front wall 428 are connected at their lower ends to a header 430 which is interposed relative to the headers 412 and 414 at the front end of the furnace, and connected thereto. The upper ends of these tubes are connected to the upper header 432 which is in communication with the header 220′ by the connection 434. The modified furnace construction indicated in Figs. 14 and 15 utilizes the same fuel firing system and the same gas tempering system as that previously described, and the water cooling tube arrangement for the front wall of the Fig. 1 primary furnace is similar to that just described, for the Fig. 14 modification.

Combustion is effected in the primary furnace chamber 10 by a series of pulverized fuel burners disposed at the top of the chamber. These burners operate with the flames extending for the full height of the furnace chamber and impinging against a layer of molten slag which flows over the furnace floor and toward the slag outlet. However, a substantial percentage of the non-combustible residues in the fuel is suspended as small particles in the furnace gases and is carried along by them. These particles first contact the upright shadow tubes 36—37 by which the furnace gases have their major stream components directed against the forwardly concave faces of the front walls of the tempering fluid ducts (Fig. 4a). The shadow tubes are refractory covered, and hence will be effective to maintain some of the adherent solids in molten condition so that they flow downwardly toward the slag disposal zone.

It is also to be noted that the shadow tubes are arranged in groups with one group presented directly forwardly of the gas passage 44, between the tempering fluid ducts 48 and 50, and the other group, comprising the shadow tubes 34—37 being disposed directly forwardly of the furnace gas passage 46 between the tempering fluid ducts 50 and 52. With this arrangement the shadow tubes operate to break up or distribute the flow of the furnace gases and to cause them to contact with the front walls of the tempering fluid ducts. This arrangement also promotes the transition of the suspended solids from a fused state to a semi-fused state by its radiant heat shielding effect upon the transition zone.

In the transition zone the furnace gases and their suspended solids are cooled by the transverse discharge of tempering fluid across the furnace gas flow in the passages 44 and 46. This flow of tempering fluid takes place through the inclined slots 80, 82, 92, 112 formed in the tempering fluid ducts bordering the gas passages 44 and 46.

The tempering fluid ducts are formed by stud tube walls vertically inclined as indicated in Fig. 1 of the drawings. With this vertically inclined arrangement, the length of the tempering gas passages 44 and 46 is greater than the vertical height of the gas chamber at that location, thus having an effect compensatory to the tendency of tempering fluid ducts to cause excessively higher gas velocities through the passages 44 and 46. Such inclination of the walls of the tempering gas ducts also provides an arrangement whereby the horizontally flowing furnace gases, in striking the forward tempering duct walls have a downward reaction toward the furnace slag outlet 314 to promote slag removal. This is further promoted by the operation of the by-pass whereby some of the furnace gases pass directly from a position forwardly of the tempering fluid ducts, through the slag discharge opening 134, and thence to a position immediately forwardly of the air heater.

The forward walls of the tempering fluid ducts also act as troughs or baffles along which streams of fused slag flow downwardly towards the slag outlet 314.

After the furnace gases are cooled by admixture with the tempering fluid, they are further cooled and distributed in the space between the tempering fluid ducts and the first tube screen 132 by contact with the platens 134 and 136 of bare and contiguous tubes. These platens also act as shields to minimize the transmission of radiant heat from the primary furnace chamber to positions beyond the transition zone. In this zone, and about the platens 134 and 136, the velocity of the gases is reduced and there is further cooling of the gases by action of the furnace wall tubes. Both of these effects contribute to the cooling of the suspended solids, their separation from the gases, and their collection in the ash disposal zone at the bottom of the installation.

After leaving the transition zone, the gases are in such condition and at such temperatures that the remainder of the suspended solids will not excessively collect upon the widely spaced tubes of the first tube screen 132. The tubes of this screen have a distributing effect upon the gases, this effect being increased by the action of the subsequent screen of the closely spaced tubes immediately in front of the superheater. This effect prevents excessive heating of parts of the superheater tubes and thus increases the life of the superheater.

Beyond the superheater the cooled solids are collected in the fly ash disposal zone beneath the bank of closely spaced steam generating tubes 170 and the gases as they leave the steam generating tubes are thus in condition to be effective upon the spaced tubes of the air heater 190.

While in accordance with the provisions of the statutes we have illustrated and described herein the best form of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. In a furnace apparatus, means including a furnace providing a flow of furnace gases with molten non-combustible particles in suspension therein, said means also including devices supplying air for combustion within the furnace, a tempering fluid duct disposed beyond the combustion zone relative to gas flow and extending across and through said gas flow in a direction oblique to the direction of the flow, and means for supplying said duct with a fluid at a temperature lower than that of said flow and the particles in suspension therein, said duct having an outlet for the discharge of the lower temperature fluid into said flow.

2. In a steam generator, a horizontally elongated and vertically restricted primary furnace, a fuel system including a set of fuel burners disposed in the furnace roof and downwardly firing the furnace at high combustion rates with a pulverized slag forming solid fuel, with the floor forming a target for the downwardly firing fuel burners, steam generating water tubes defining the floor and other boundaries of the furnace, the fuel system with its burners being so coordinated with the furnace floor that flames from the burners impinge upon a molten ash or slag stratum on the floor, said stratum continuously receiving replenishments during the normal operation of the burners, the horizontal elongation of said furnace being provided at a position laterally remote from the burners with an opening through which molten slag may continuously pass, a steam generating convection section, and means including fluid cooled furnace boundary elements in the horizontal elongation of the furnace to provide a gas exit opening from the furnace and providing for the solidifying of the preponderance of all slag particles in gas suspension before the gases pass beyond said opening and to the convection section, said last named means also including a duct through which a tempering fluid is supplied for cooling the furnace gases by direct mixture therewith, said duct extending through and transversely of furnace gas flow and having its outlet in direct communication with the furnace gases.

3. In a method of burning an ash bearing solid fuel, burning the fuel in pulverized form in a combustion zone and thereby transforming the non-combustible residue of the fuel to molten condition, said burning including the providing of air flow into the combustion zone continuously subjecting the flames of said fuel to contact with a mass of said molten residue, causing said molten residue to flow from said zone to prevent excessive accumulation therein, mixing a tempering fluid with the combustion gases exiting from said zone together with particles of non-combustible fuel residue suspended therein, the mixing of the tempering fluid with the combustion gases being effected by dividing the combustion gases and initially introducing the tempering fluid into the combustion gases adjacent the point of division, said tempering fluid having a temperature below the solidifying temperature of said residue particles, varying the supply of pulverized fuel and air to said zone in accordance with varying demands for heat, and varying the flow and mixing of the tempering fluid with the combustion gases in accordance with the air flow variations.

4. In a steam generator, a horizontally elongated and vertically restricted primary furnace, a fuel burning system including a set of fuel burners disposed in the roof of the furnace and downwardly firing the furnace at high combustion rates with an ash or slag forming solid fuel, fluid cooled tubes defining the floor and other boundaries of the furnace, the furnace floor having a slag discharge opening to which molten slag may flow from a position opposite the burners, the fuel system with its burners being so coordinated with the furnace floor that flames from the burners impinge upon a molten ash or slag stratum on the floor, a convection section heated by the furnace gases, means providing for the solidifying of the preponderance of all slag particles in gas suspension before the gases pass to the convection section, said last named means including upright steam generating tubes constructed and arranged to form transversely spaced furnace gas passages and tempering fluid ducts at the opposite sides of the passages, the ducts having lateral openings leading into said passages, and means supplying said ducts with a tempering fluid which flows through said lateral openings and is injected into and mixed with the furnace gases.

5. Apparatus for conditioning products of combustion of pulverized coal flowing horizontally in a gas pass extending horizontally from a high temperature furnace to a convection section including spaced fluid heating tubes, said apparatus including a water cooled furnace having a floor over which a slag stratum flows to a slag discharge opening, a tempering fluid system including fluid cooled ducts for introducing and mixing a tempering fluid with the horizontally flowing furnace gases, said ducts extending obliquely upwardly and forwardly of said opening through the furnace gases and having elongated longitudinally narrow tempering fluid discharge ports opening toward the stream of furnace gases.

6. In a water tube steam generator, a primary furnace having means associated therewith for burning pulverized fuel at furnace temperatures above the fusion temperatures of the non-combustible in the fuel, the primary furnace having a horizontal extension formed by wall cooling steam generating tubes, groups of forwardly inclined steam generating tubes connected into the circulation of the generator and arranged to present a furnace cooling barrier across the vertical extent of the furnace with an opening between the groups of tubes for the exit of furnace gases from the furnace, said groups of tubes being also arranged to form tempering fluid ducts of relatively large free flow area extending into the furnace and having tempering fluid ports at the sides of said passage, means for supplying said ducts with a supply of tempering fluid for flow of that fluid through said ports into mixing relationship with the furnace gases flowing through said passage, a group of upright fluid cooled shadow tubes across the extension of the primary furnace at a position forwardly of said passage, an upright platen consisting of a plurality of upright steam generating tubes in contiguous relation and installed as a canopy directly rearwardly of the gas passage between the tempering fluid ducts, said platen acting as a target wall to catch sprays of slag shot and acting to shield subsequent heat absorbing surfaces from the primary furnaces, and a convection section including a bank of steam generating tubes and a superheater disposed rearwardly of said platen.

7. In a pulverized fuel burning furnace operating at temperatures above the fusion temperature of the slag in the fuel, a furnace floor formed by fluid connecting floor cooling tubes arranged to form a slag discharge opening, a slag receiving chamber beneath said opening, and a periodically operable slag wiper mounted exteriorly of the furnace at the downflow side of said opening and including a water cooled arm transversely movable across said opening to break off particles of slag collected thereon.

8. Apparatus for conditioning products of combustion of pulverized coal flowing horizontally in a gas pass extending horizontally from a high temperature furnace to a convection section including closely spaced fluid heating tubes, said apparatus including a water cooled furnace formed to present a floor having a slag discharge opening therein and adapted to have a slag stratum flowing over its floor to said opening, a tempering fluid system including fluid cooled ducts for introducing and mixing a tempering fluid with the horizontally flowing stream of furnace gases before they contact the convection section, said ducts being inclined and extending upwardly and forwardly of said opening through the furnace gases and having tempering fluid discharge ports opening toward the stream of furnace gases and means supplying tempering fluid to said ducts.

9. In a furnace installation, burners, means supplying pulverized fuel and air to the burners for firing the furnace at temperatures above the fusion temperature of the non-combustible residue of the fuel, said boundary surfaces including a floor receiving said residues to form a molten slag layer, the furnace floor being provided with a slag discharge opening, a slag pan beneath said opening, a slag clearer including a fluid cooled member normally movable transversely relative to said slag discharge opening to clear away solidified slag which tends to close said opening, means causing a cooling fluid to flow through said member and discharge therefrom into the slag pan to replace fluid loss due to evaporation.

10. In a steam generator, down-fired pulverized coal burning furnace, burners, water cooled tubes defining the furnace boundary surfaces including a floor disposed beneath the burners for flame mixing impingement, the furnace having a water cooled horizontal extension for the discharge of combustion products, a convection section including closely spaced steam generating tubes, upright shadow tubes in the furnace extension, spaced groups of steam generating tubes rearwardly of the shadow tubes and forming tempering fluid ducts with their outlets leading to gas passages between said groups, means supplying a tempering fluid to said ducts, other spaced groups of upright steam generating tubes with the tubes of each group closely arranged to form radiant heat shields rearwardly of said gas passages and forwardly of the convection section.

11. In a furnace installation, burners, means supplying pulverized fuel and air to the burners for firing the furnace at temperatures above the fusion temperature of the non-combustible residue of the fuel, the furnace having boundary surfaces including a floor receiving said residues to form a molten slag layer, the furnace floor being provided with a slag discharge opening, a slag clearer including a fluid cooled member normally movable transversely relative to said slag discharge opening to clear away solidified slag which tends to close said opening, and means mounting the slag clearer exteriorly of the furnace and at the downflow side of said opening.

12. A pulverized coal fired water tube steam generator of restricted vertical and transverse dimensions characterized by having at longitudinally successive positions, a vertically downwardly fired combustion chamber, water cooled slag collecting surfaces defining a molten slag removal zone, means including steam generating water tubes arranged to form a tempering gas duct for the introduction of a tempering fluid stream into mixing relationship with the furnace gases leaving the slag removal zone, and convection steam generating and superheating surfaces arranged beyond the slag removal zone in the direction of gas flow, the steam generating surfaces being presented by vertically extending tubular elements connected into fluid circulation of the generator.

13. In a fluid heat exchange unit, a convection section including spaced fluid heating tubes disposed in the path of heating gases, a furnace from which heating gases flow to the convection section, and tempering fluid ducts formed by fluid conducting tubes, said tempering fluid ducts being disposed so as to divide the combustion gases and each having a furnace gas tempering fluid outlet in the path of oncoming furnace gases.

14. In an installation of the class described, a furnace having its boundary surfaces defined by fluid conducting tubes, burners, means supplying pulverized fuel and air to the burners for firing the furnace at temperatures above the fusion temperature of the non-combustible residue of the fuel, said boundary surfaces including a floor receiving said residues to form a molten slag layer, the furnace floor being provided with a slag discharge opening, a slag receiver beneath said opening, a slag clearer including a member normally movable transversely relative to said slag discharge opening to clear away solidified slag which tends to close said opening, means causing a cooling fluid to flow through said member and discharge therefrom into the slag pan to replace fluid loss due to evaporation, and means including ductwork communicating with the space below said slag discharge opening to provide for the flow of high temperature furnace gases through said opening.

15. In a fluid heat exchange installation, a furnace, means firing the furnace with an ash bearing fuel under such temperature conditions as to develop molten ash and high temperature gaseous combustion products, the furnace having a floor receiving molten ash or slag from the burning fuel, the furnace having a slag discharge opening, the furnace being formed with a gas discharge passage, means forming a tempering fluid channel extending across said passage and operating to divide gas flow from the furnace into a plurality of streams, said channel being formed with port means so associated with channel as to direct tempering fluid from the channel into mixing relationship with the furnace gases, the channel normally conducting a tempering fluid of a temperature substantially below the fusing temperature of the fuel ash for cooling the furnace gas entrained ash to a temperature below its fusion temperature.

16. In the conditioning of the products of combustion resulting from the high temperature combustion of an ash bearing fuel, the method comprising the burning of fuel at high temperatures above the ash fusion temperature, causing the gas suspended particles of non-combustible residue and other products of said combustion to flow from the combustion zone to and through a high temperature convection heat absorbing zone, dividing the stream of said products of combustion flowing to the convection zone, introducing into said divisions of the combustion products stream a gaseous tempering fluid at a temperature less than the molten condition temperature of said particles of non-combustible, and mixing said gaseous tempering fluid with the combustion products adjacent the zone of division.

17. In a vapor generating unit, a convection section including spaced fluid heating tubes, a furnace including combustion means effecting such fuel combustion that suspended particles of non-combustible are carried toward the convection section by the stream of gaseous products of combustion, an elongated gas tempering duct extending across and through the gas flow from the furnace to the convection section, said duct having a longitudinally extended tempering fluid outlet effecting the distribution of tempering fluid transversely of the stream of combustion products, and means conducting to said duct a gaseous tempering fluid of a temperature less than the molten condition temperature of said particles.

18. In a fluid heat exchange unit, a furnace having boundaries including fluid conducting tubes, a burner firing the furnace with a slag forming fuel at temperatures above the fusion temperature of the slag, some of said tubes formed about a slag discharge opening at the lower part of the furnace, a slag clearer disposed adjacent said opening and adapted to impact and remove slag accumulations restricting the opening, and means movably mounting the slag clearer exteriorly of the furnace and at the downflow side of said slag discharge opening wherein it is normally out of the path of slag discharge.

19. In a fluid heat exchange unit, a furnace having boundaries including fluid conducting tubes, burner means firing the furnace with a slag forming fuel at temperatures above the slag fusion temperature, the furnace having a slag discharge opening at its lower part, and a slag clearer mounted exteriorly of the furnace at the downflow side of said opening and having an element movable to a position of contact with slag accumulations adjacent said opening from a position outside the path of slag movement from the opening, and means for so moving said element.

20. In a furnace having an opening at its lower part for the discharge of molten slag, means firing the furnace with a slag forming fuel at temperatures above the fusion temperature of the slag, a slag clearer impacting and removing slag bodies accumulated at said opening, and means movably mounting the slag clearer exteriorly of the furnace and at the downflow side of said slag discharge opening wherein it is normally out of the path of slag discharge.

21. In a furnace having an opening at its lower part for the discharge of molten slag, means firing the furnace with a slag forming fuel at temperatures above the fusion temperature of the slag, a slag clearer having a fluid cooled movable member impacting and removing slag bodies accumulated at said opening, and means movably mounting the slag clearer exteriorly of the furnace and at the downflow side of said slag discharge opening wherein it is normally out of the path of slag discharge.

22. In a fluid heat exchange unit, a convection section including spaced fluid heating tubes disposed in the path of a stream of heating gases, a furnace from which heating gases flow to and over the tubes of the convection section, and means for introducing a tempering fluid into said stream of heating gases, said means including a series of separate adjacent fluid heating tubes arranged girthwise about a duct space to form a duct extending across and through the flow of heating gases and dividing said stream, and a tempering fluid outlet for the discharge of tempering fluid from said duct into said stream of heating gases, the separate tubes of said series also extending through and across said stream.

23. In a steam generating unit; a convection section including spaced fluid heating tubes disposed in the path of a stream of heating gases; a furnace from which heating gases flow to and over the tubes of the convection section; and means for introducing a tempering fluid into the stream of heating gases; said means including separate, adjacent, and parallel steam generating tubes connected into the fluid system of the unit and arranged girthwise about a duct space to form a tempering fluid duct extending across and dividing the flow of heating gases at a position between the furnace and the convection section, said duct forming steam generating tubes also extending across the flow of heating gases and arranged to form a tempering fluid outlet for the discharge of tempering fluid from said duct into the stream of heating gases.

ERVIN G. BAILEY.
RALPH M. HARDGROVE.

References Cited in the file of this patent

UNITED STATES PATENTS

| Number | Name | Date |
|---|---|---|
| 594,396 | Handbury | Nov. 30, 1897 |
| 1,075,194 | Cook | Oct. 7, 1913 |
| 1,228,769 | Grindle | June 5, 1917 |
| 1,284,546 | Allen | Nov. 12, 1918 |
| 1,298,530 | Mann | Mar. 25, 1919 |
| 1,474,162 | Pratt | Nov. 13, 1923 |
| 1,532,103 | Kraemer | Mar. 31, 1925 |
| 1,670,276 | Worthington | May 15, 1928 |
| 1,701,853 | Jackson | Feb. 12, 1929 |
| 1,701,855 | Jackson | Feb. 12, 1929 |
| 1,764,981 | Rehfuss | June 17, 1930 |
| 1,792,068 | Caracristi | Feb. 10, 1931 |
| 1,848,565 | Jacobus | Mar. 8, 1932 |
| 1,858,451 | Coutant | May 17, 1932 |
| 1,863,218 | Allen | June 14, 1932 |
| 1,874,236 | Bruce | Aug. 30, 1932 |
| 1,874,487 | Granklin | Aug. 30, 1932 |
| 1,887,891 | Roosen | Nov. 15, 1932 |
| 2,344,347 | Foresman | Mar. 14, 1944 |
| 2,346,715 | Woodard et al. | Apr. 18, 1944 |
| 2,399,884 | Noack | May 7, 1946 |
| 2,551,945 | Harvey | May 8, 1951 |

FOREIGN PATENTS

| Number | Country | Date |
|---|---|---|
| 1,640 | Great Britain | Jan. 20, 1913 |
| 473,341 | Germany | Mar. 13, 1929 |